(12) United States Patent
Scaramucci et al.

(10) Patent No.: US 10,323,765 B2
(45) Date of Patent: Jun. 18, 2019

(54) KIT FOR MOUNTING AN ACTUATOR TO A VALVE

(71) Applicant: Valve Innovations, LLC, Oklahoma City, OK (US)

(72) Inventors: John P. Scaramucci, Oklahoma City, OK (US); Danny R. Lowe, Oklahoma City, OK (US); Jason C. Thorp, Oklahoma City, OK (US)

(73) Assignee: Valve Innovations, LLC, Oklahoma City, OK (US)

( * ) Notice: Subject to any disclaimer, the term of this patent is extended or adjusted under 35 U.S.C. 154(b) by 0 days.

(21) Appl. No.: 15/946,532

(22) Filed: Apr. 5, 2018

(65) Prior Publication Data

US 2018/0224016 A1 Aug. 9, 2018

Related U.S. Application Data

(62) Division of application No. 15/175,878, filed on Jun. 7, 2016, now Pat. No. 9,964,226.

(51) Int. Cl.
| | |
|---|---|
| *F16K 27/06* | (2006.01) |
| *F16K 5/06* | (2006.01) |
| *F16K 31/04* | (2006.01) |
| *F16K 31/06* | (2006.01) |
| *F16K 31/05* | (2006.01) |

(52) U.S. Cl.
CPC .......... *F16K 27/067* (2013.01); *F16K 5/0647* (2013.01); *F16K 31/041* (2013.01); *F16K 31/055* (2013.01); *F16K 31/0644* (2013.01); *Y10T 137/0508* (2015.04)

(58) Field of Classification Search
CPC .. F16K 27/067; F16K 31/055; F16K 31/0644; F16K 5/0647; F16K 31/041; Y10T 137/0508
USPC ..... 251/292–293, 315.01–315.16; 137/15.22
See application file for complete search history.

(56) References Cited

U.S. PATENT DOCUMENTS

| | | | |
|---|---|---|---|
| 4,719,939 A | 1/1988 | Killian | |
| 4,817,663 A * | 4/1989 | McAndrew | ........... F16K 5/0647 251/292 |
| 4,887,634 A | 12/1989 | Killian | |
| 5,203,370 A | 4/1993 | Block et al. | |
| 5,240,030 A * | 8/1993 | Wang | ..................... F16K 31/00 251/292 |

(Continued)

FOREIGN PATENT DOCUMENTS

EP 1 488 150 3/2010

*Primary Examiner* — John Bastianelli
(74) *Attorney, Agent, or Firm* — Dunlap Codding, P.C.

(57) ABSTRACT

An actuator mounting kit and method for mounting an automatic valve actuator to a manually operated valve. The mounting kit includes a mounting bracket and a stem driver. The mounting bracket is connectable to the valve and has a bottom portion with a stem aperture through which a valve stem is extendable and a tongue matingly engageable with a slot of the valve body. The mounting bracket has an upper portion with a driver aperture aligned with the stem aperture. The stem driver has a first end matingly engageable with the valve stem and a second end extendable through the driver aperture in a way that the actuator is matingly engageable with the second end of the stem driver when the actuator is connected to the upper portion of the mounting bracket.

12 Claims, 4 Drawing Sheets

(56) References Cited

U.S. PATENT DOCUMENTS

| | | |
|---|---|---|
| 5,323,805 A | 6/1994 | Scaramucci |
| 5,564,461 A | 10/1996 | Raymond, Jr. et al. |
| 5,634,486 A | 6/1997 | Hatting et al. |
| 5,954,088 A | 9/1999 | Huang |
| 5,967,171 A | 10/1999 | Dwyer, Jr. |
| 6,446,935 B1 | 9/2002 | Winkler |
| 6,662,821 B2 | 12/2003 | Jacobsen et al. |
| 6,742,765 B2 | 6/2004 | Takano et al. |
| 6,913,034 B2 | 7/2005 | Szafron |
| 7,066,192 B1 | 6/2006 | Delaney et al. |
| 8,256,742 B2 | 9/2012 | Staffiere et al. |
| 2002/0088962 A1* | 7/2002 | Takano ................ F16K 31/047 251/292 |
| 2007/0176068 A1 | 8/2007 | Kuo-Chen |
| 2014/0001383 A1 | 1/2014 | Staffiere et al. |

\* cited by examiner

KIT FOR MOUNTING AN ACTUATOR TO A VALVE

CROSS-REFERENCE TO RELATED APPLICATION

This application is a divisional of U.S. Ser. No. 15/175,878, filed on Jun. 7, 2016, the entire contents of which being hereby expressly incorporated herein by reference.

BACKGROUND

Numerous types of valves exist to regulate fluid flow within a piping system or flow conduit. Some valves restrict flow with an axial movement or displacement of a valve element within the housing or valve body. For instance, most spool valves and globe valves restrict flow with an axial displacement of a needle, plug or spool within the valve body. The force causing the displacement of the valve element may be provided in a number of ways, such as with hydraulic, pneumatic or other pressure control on a different portion of the valve element. Other valves operate based on a rotary movement or pivoting of a valve element relative to the housing. For instance, many ball valves and rotary valves operate based on a rotating ball or spool relative to the housing without any displacement between the two. Even with displacement type valves, the axial displacement may occur as a result of a screw threaded advance, and thus adjustment of the valve occurs primarily due to a rotational motion. The present invention is applicable to all types of rotationally controlled valves, and particularly applicable to rotary control valves without axial displacement, such as ball valves.

Within the past several decades it has become common to employ automated control systems to operate valves rather than requiring manual control. The automated control systems include an actuator for each valve in the system. The actuator may include an electrically powered motor or solenoid which controls the position of the valve element based on electrical input to the actuator.

Often it is desired to retrofit existing piping systems to include an automated control system. The retrofit involves adding actuators to open, close, and/or adjust valves in place of previous manually moved handles.

Particularly when retrofitting a valve in an existing piping system with an actuator, it is difficult to precisely align the actuator with the valve stem. Misalignment may occur with a displacement component, when the shaft coupling the actuator to the valve is displaced from the axis of the valve stem, even though the shaft axis is parallel to the valve axis. For instance, some valves already include a flange with threaded holes to facilitate mounting of a handle or other external device, and the flange may be used for mounting of the actuator. However, the valve stem axis may not be exactly centered between the threaded holes on the flange. Misalignment may also occur with an angular offset, when the shaft coupling the actuator to the valve stem is disposed at an angle to the valve stem. For instance, the plane formed by the flange may not be exactly perpendicular to the valve stem axis.

Some valve stems include flats to facilitate rotating the valve stem, but these flats may not be entirely parallel to each other and equally spaced on opposite sides of the valve stem axis. The valve stem itself may not be aligned with the axis of rotation of the valve element, and may not perfectly rotate about its axis. Any of these problems can result in misalignment between the actuator and the valve stem. Some misalignments include both a displacement component and an angular offset component.

When the valve is manually turned, these existing inaccuracies may not pose major problems. Manual handles are typically mounted directly to valve stems, limiting the effect of any angular offset. The manual handle is left free for grasping, and rarely transmits a residual stress. Forces transmitted to the valve stem are generally not exactly reproduced from rotation to rotation, so any wear problems associated with misalignment are not focused at a particular location. Manual turning also has a great capacity to adjust the turning torque appropriately for the turning force required.

In contrast, when an automated control system with an actuator is used to turn the valve, any misalignment between the actuator shaft and the valve stem becomes more significant for a number of reasons. First, the actuator shaft extends the valve stem a significant distance, thus any angular offset results in a large difference between the valve stem and the actuator. Second, in contrast to the manual handle, the shaft does not terminate in a free end, and misalignment will often result in a residual stress or bending moment on the valve stem. That is, if the shaft is misaligned to place a bending moment on the valve stem, that bending moment will be constant, and will not relax just because the valve is not being moved. Third, the actuator places forces on the valve stem which are exactly reproduced for each turning of the valve stem, resulting in more focused wear problems. Fourth, if the valve stem itself does not rotate perfectly about its axis, the shaft may place a bending moment on the valve stem with a magnitude that changes upon the rotational location of the valve. For instance, the valve stem may be fairly free of residual stress when the valve is closed, but have a severe bending moment when the valve is open.

Thus, any misalignment can cause a variety of problems in the piping system and/or the automated control system. As the valve stem is repeatedly and continually stressed over time, the valve stem may warp or be broken off entirely, rendering the valve inoperable. If the automated control system does not have feedback sensors in place, such breakage may not be readily identified, and the actuator may continue to turn the shaft even though the valve element is not being moved. More likely than breakage, the seals around the valve stem are likely to wear excessively and start leaking. If the shaft "binds" or torques differently depending on the position of the valve, the actuator may have trouble turning the shaft, or may not turn the shaft an appropriate amount corresponding to the input signal.

Accordingly, there exists a need for a kit for mounting an actuator to a valve in a way that reduces repair and maintenance costs. The inventive concepts disclosed herein are directed to such an assembly.

DETAILED DESCRIPTION OF EXEMPLARY EMBODIMENTS

Figure 1:
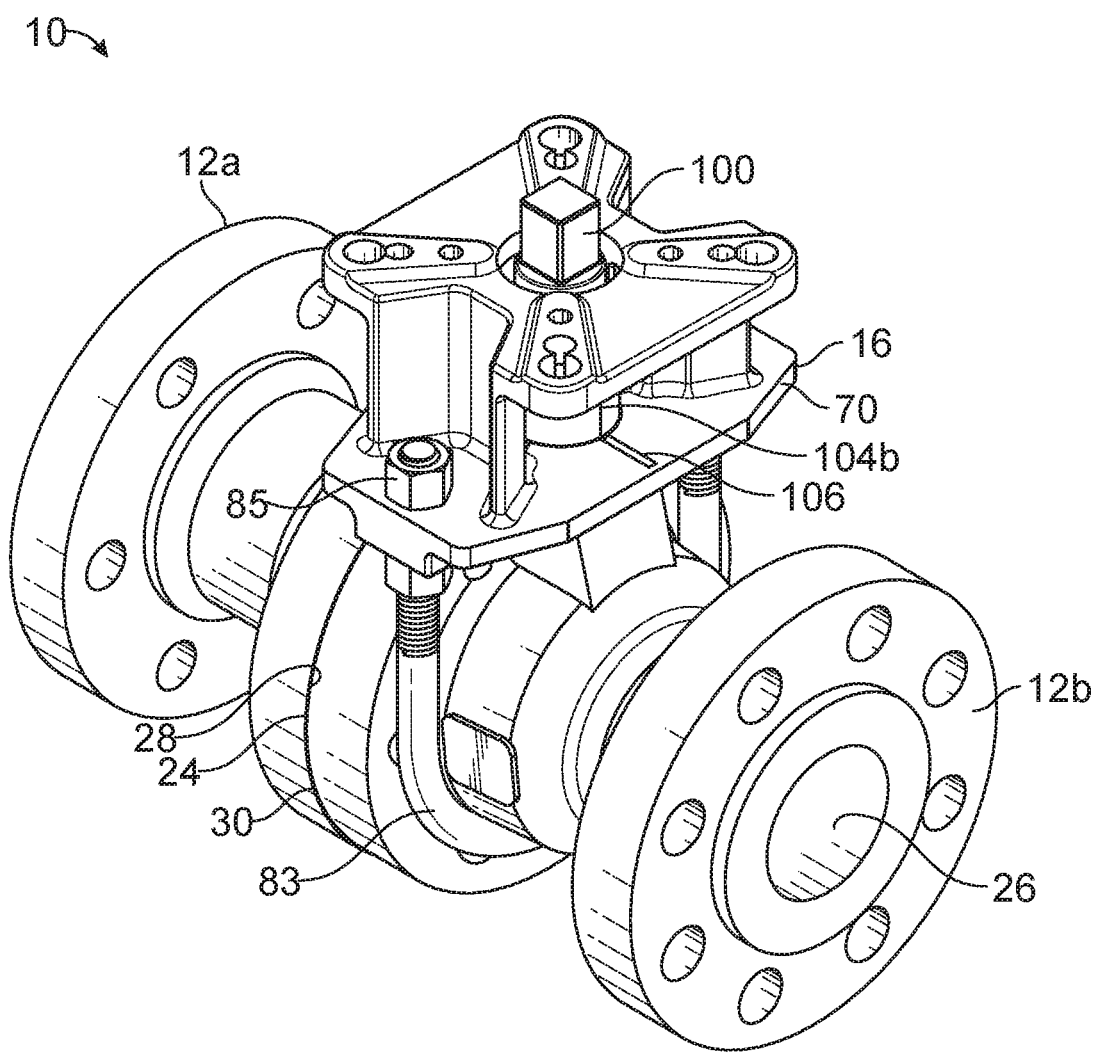
FIG. 1 is a perspective view of a valve assembly with an actuator mounting kit constructed in accordance with the inventive concepts disclosed herein shown connected to a valve.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The systems and methods as described in the present disclosure are capable of other embodiments or of being practiced or carried out in various ways. Also, it is to be understood that the phraseology and terminology employed herein is for purposes of description, and should not be regarded as limiting.

The following detailed description refers to the accompanying drawings. The same reference numbers in different drawings may identify the same or similar elements.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements, but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, any reference to "one embodiment," "an embodiment," "some embodiments," "one example," "for example," or "an example" means that a particular element, feature, structure or characteristic described in connection with the embodiment is included in at least one embodiment. The appearance of the phrase "in some embodiments" or "one example" in various places in the specification is not necessarily all referring to the same embodiment, for example.

As used herein, the term "drilling fluid" or "drill fluid" refers to circulating fluid used in rotational drilling to perform various functions during drilling operations.

Figure 2:
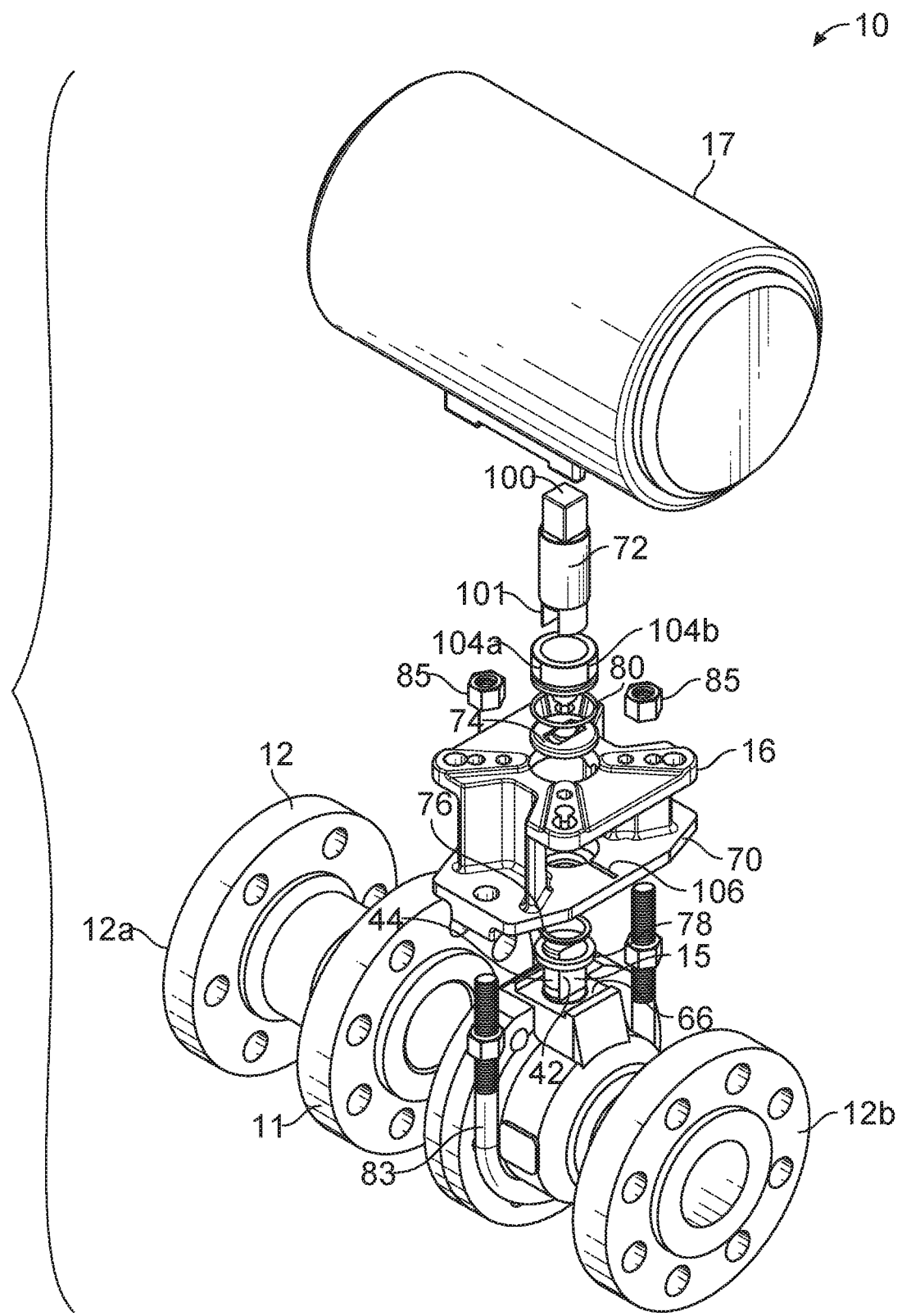
FIG. 2 is an exploded, perspective view of the valve assembly of FIG. 1 shown with an actuator.

Referring now to the drawings, and in particular to FIGS. 1 and 2, shown therein is an embodiment of a valve assembly 10 constructed in accordance with the inventive concepts disclosed herein. In general, the valve assembly 10 includes a valve 11, an actuator mounting kit 16, and an actuator 17 operably connected to the valve 11 and supported by the actuator mounting kit 16. The valve 11 includes a valve body 12, a valve member 14 disposed in the valve body 12 for rotation between an open position (FIG. 3) and a closed position (not shown), and a valve stem 15 to which a handle (not shown) is connected for rotating the valve member 14 between the open position and closed position. The valve body 12 may include a first valve body 12a and a second valve body 12b. The first valve body 12a is provided with a first bore 22 and a first end 24. The second valve body 12b is provided with a second bore 26 and a second end 28. The first end 24 of the first valve body 12a is connected to the second end 28 of the second valve body 12b to form the valve body 12 such that the first bore 22 communicates with the second bore 26. The first valve body 12a may be connected to the second valve body 1b with connecting members (not shown), such as bolts.

Figure 3:
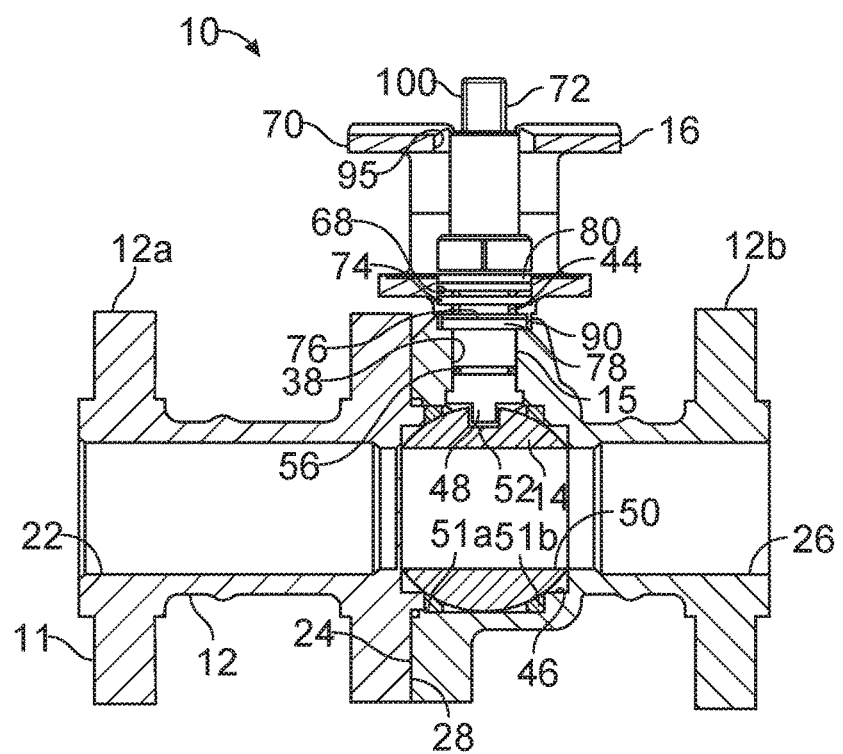
FIG. 3 is a partial sectional view of the valve assembly of FIG. 1 with the actuator omitted.

Referring now to FIG. 3, in one embodiment of the valve 11, the second valve body 12b is provided with a bore 38 extending upwardly from a valve chamber 46 formed in the second bore 26 of the second valve body 12b. The bore 38 is configured to receive at least a portion of the valve stem 15. The valve stem 15 is provided with a pair of parallel, flat surfaces 42, which leave curved surfaces 44 on an outer surface of the valve stem 15 between the flat surfaces 42 (FIGS. 2 and 3).

As shown in FIG. 3, the valve member 14 has a central bore 50 which aligns with the first bore 22 and the second bore 26 in the open position of the valve member 14 to permit the passage of fluid through the valve 11 when the valve member 14 is in the open position thereof. In the closed position of the valve member 14, seat assemblies 51a or 51b engage the exterior surface of the valve member 14 and internal surfaces of the valve body assembly 12 to form fluid tight seals which disrupt fluid communication between the first bore 22 and the second bore 26. The valve member 14 has an exterior slot 52 for receiving a distal end of the valve stem 15. The exterior slot 52 is sized with respect to the stem to permit movement of the valve member 14 in an axial direction when the valve member 14 is rotated to the closed position. Thus, the valve member 14 illustrated herein is of the type known in the art as a "floating" valve member or valve ball.

A suitable seal 56 fits in a mating groove around the central portion of the valve stem 15 to prevent leakage from the valve chamber 46 through the bore 38 around the valve stem 15.

Referring now to FIGS. 1-6, in one embodiment, the actuator mounting kit 16 is provided with a mounting bracket 70, a valve stem driver 72, a weather seal 74, a split retainer ring 76, an alignment bushing 78, and a valve stem driver seal 80, and a connector, such as a U-bolt 83 and a plurality of nuts 85.

Figure 5:
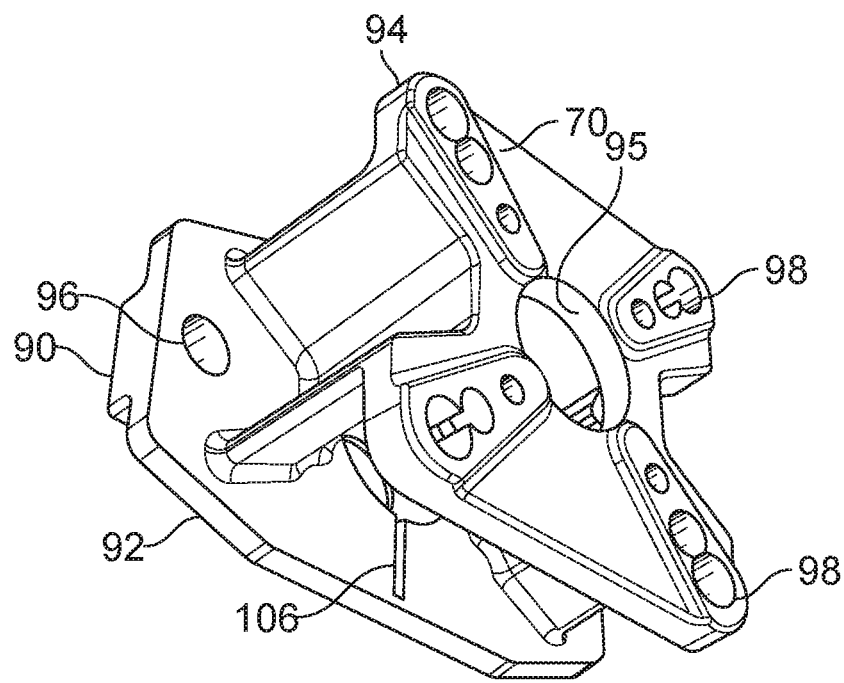
FIG. 5 is a top perspective view of the mounting bracket of the actuator mounting kit.
Figure 6:
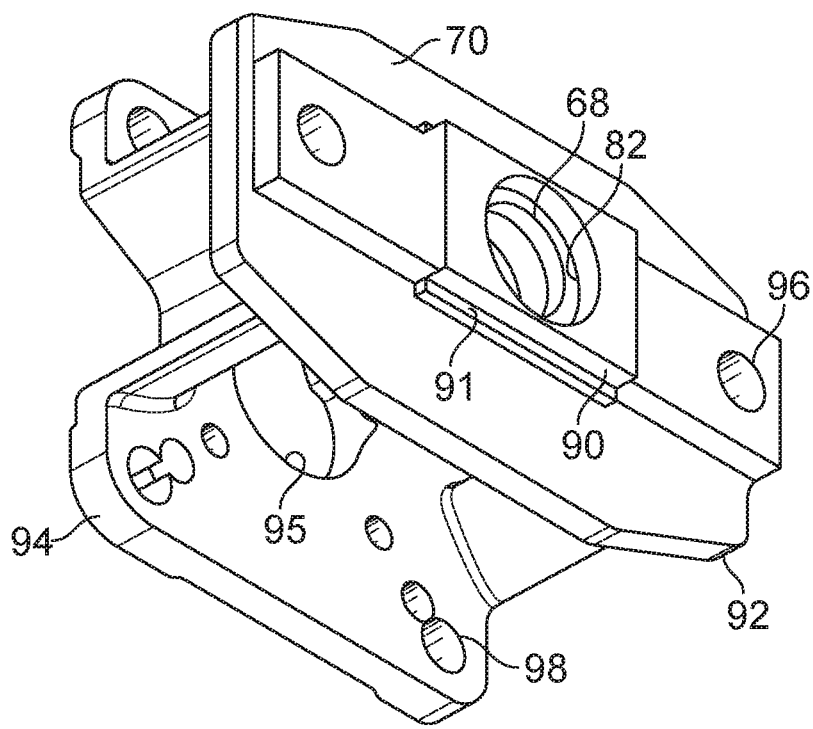
FIG. 6 is a bottom perspective view of the mounting bracket of the actuator mounting kit.

As shown in FIG. 3, the mounting bracket 70 of the actuator mounting kit 16 is mounted on the second valve body 12b in a slot 66 formed in an outer surface of the second valve body 12b with a stem aperture 68 substantially aligned with the bore 38 of the second valve body 12b. The mounting bracket 70 is shown in more detail in FIGS. 5 and 6. As shown in FIGS. 5 and 6, the mounting bracket 70 is generally rectangularly shaped and is provided with the stem aperture 68, a counterbore 82 in the stem aperture 68, a tongue 90, a bottom portion 92, a top portion 94 with a driver aperture 95, a plurality of mounting bores 96, and a plurality of actuator mounting bores 98.

The tongue 90 of the mounting bracket 70 has a predetermined width and extends outwardly a predetermined distance from a lower surface of the bottom portion 92 of the mounting bracket 70. The tongue 90 is shaped and sized to mate with the slot 66 of the second valve body 12b. A pair of support shoulders 91 extends along the sides of the tongue 90. As described in U.S. Pat. No. 5,323,805, the description of which is hereby incorporated herein by reference in its entirety, the slot 66 is provided to matingly receive a locking plate. In use, the stop plate is positioned in the slot 66 and encircles the valve stem 15. The stop plate has at least one locking opening spaced from the aperture. A locking plate is secured on the valve stem 15 parallel with the stop plate to turn with the valve stem 15 during opening and closing of the valve. The locking plate has at least one locking opening therethrough positioned to mate with the locking opening in the stop plate when the valve is in a fully closed or fully open positioned so that a securing member, such as a lock or seal may be inserted through the openings to secure the valve in the desired position.

In the embodiment shown, the stem aperture 68 of the mounting bracket 70 extends through a central portion of the bottom portion 92 of the mounting bracket 70 and the tongue 90. The stem aperture 68 may be configured to receive at least a portion of the valve stem 15. The driver aperture 95 is aligned with the stem aperture 68 and is configured to receive a portion of the valve stem driver 72 through the top portion 94. In some embodiments, the stem aperture 68 may have a first diameter for receiving the valve stem 15 and the driver aperture 95 may have a second diameter for receiving the valve stem driver 72.

Figure 4:
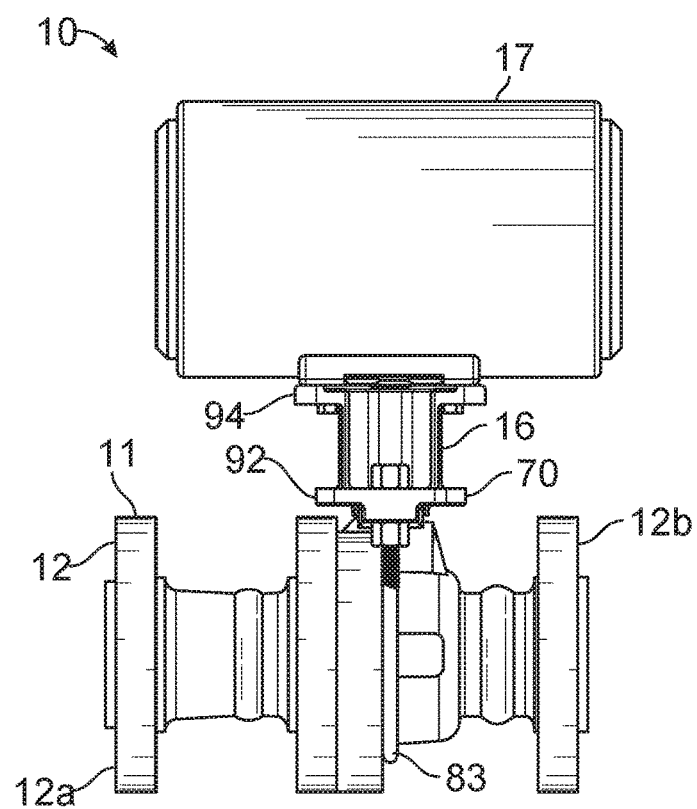
FIG. 4 is a side elevational view of the valve assembly.

The plurality of mounting holes 96 of the mounting bracket 70 extend through the tongue 90 and the bottom portion 92 of the mounting bracket 70 in alignment with the aperture 68. The mounting holes 96 are sized to allow threaded ends of the U-bolt 83 to pass therethrough and secure the mounting bracket 70 to the second valve body 12b with nuts 85 (as shown in FIGS. 1 and 4).

The plurality of actuator mounting holes 98 of the mounting bracket 70 may be sized and arranged to allow the actuator 17 to be mounted and secured to the upper portion 94 of the mounting bracket 70 via securing means such as, for instance bolts (not shown) known in the art.

Referring once again to FIGS. 2 and 3, the weather seal 74 of the actuator mounting kit 16 has a pair of shoulders (not shown) projecting inwardly and positioned to engage the flat surfaces 42 of the valve stem 15 such that when the valve stem 15 is turned, the weather seal 74 is also turned.

The alignment bushing 78 is secured to the valve stem 15 by the split retainer ring 76 mounted in mating grooves in the curved surfaces 44 of the outer surface of the valve stem 15. The alignment bushing 78 has an outer diameter that is substantially the same as the first diameter of the aperture 68. As can be seen in FIG. 3, a bottom surface of the alignment bushing 78 is adjacent to a flat surface provided by the slot 66 of the valve body 32 and aligns the valve stem 15 in the aperture 68 of the mounting bracket 70.

The valve stem driver 72 is generally cylindrically shaped and provided with an actuator connecting portion 100 formed in one end, a valve stem connecting portion 101 (FIG. 2) formed in an opposite end, and the valve stem driver seal 80. The actuator connecting portion 100 may be configured to be mated to an actuator shaft (not shown) and may form a square as shown in FIG. 1. The actuator connecting portion 100 of the valve stem driver 72 extends a predetermined distance upward from the end and is configured to receive at least a portion of the valve stem 15 to allow rotation of the valve stem 15 when the valve stem driver 72 is rotated, for instance, by the actuator, thus moving the valve member 14 between an open or a closed position.

The valve stem driver seal 80 fits in a mating groove around a portion of the valve stem driver 72 to prevent passage of fluid and/or debris into the aperture 68 around the valve stem driver 72.

The mounting bracket 70 and the valve stem driver 72 may be provided with corresponding valve position indicator markings. In one embodiment, the valve stem driver 72 is provided with indicia 104a and 104b indicating open and closed, respectively. Such indicia are spaced at a 90° interval. The indicia 104a and 104b are alignable with a mark 106 on the mounting bracket 70 to provide a visual indication of the position of the valve.

To automate the valve 11 with the actuator 17, the stop plate and stop plate are first removed from the valve. The alignment bushing 78 may then be installed over the valve stem 15. The mounting bracket 70 is connected to the valve body 12 with the valve stem 15 extending through the aperture 68 and the tongue 90 matingly engaged with the slot 66. The counterbore 82 receives the alignment bushing 78. The mounting bracket 70 may be secured to the second valve body 12b with the U-bolt 83. The weather seal 74 may then be positioned over the valve stem 15.

The valve stem connecting portion 101 of the valve stem driver 72 is then engaged with the valve stem 15 in a way that the actuator connecting portion 100 extends through the driver aperture 69. The actuator 17 is then connected to the upper portion 94 of the mounting bracket 70 and matingly engaged with the actuator connecting portion 100.

In embodiments such as those shown in FIGS. 1-6, alignment of the valve stem 15 in the aperture 68 with the alignment bushing 78 ensures that the mounting bracket 70 is aligned with the second valve body 12b. This alignment in turn assures that a longitudinal axis of the valve stem driver 72 is substantially aligned with a longitudinal axis of the valve stem 15. In addition, fitting the tongue 90 of the mounting bracket 70 in the slot 66 of the second valve body 12b prevents rotational movement of the mounting bracket 70 when the actuator applies rotational movement to the valve stem driver 72 which in turn applies rotational movement to the valve stem 15. These features work together to ensure that off-axis movement is not applied to the valve stem 15 by the actuator 17 which could damage one or more components of the valve assembly 10.

While the valve assembly 10 is described herein as having first and second valve bodies 12a and 12b which are secured together to form the valve body 12, it should be noted that in some embodiments, the valve assembly 10 may be provided with a different valve body design such as, for instance, a unibody design similar to the one shown and described in U.S. Pat. No. 5,323,805, so long as the mounting bracket may be engaged with or locked to the valve body in a way that prevents rotation of the mounting bracket relative to the valve body.

It should also be noted that although the valve assembly system 10 has been shown and described herein as a ball-type valve, the presently disclosed concepts are applicable to all types of rotationally controlled valves.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the scope and coverage of the inventive concepts disclosed and claimed herein.

What is claimed is:

1. An actuator mounting kit for mounting an automatic valve actuator to a valve, the valve having a valve body, a valve member rotatably disposed within a bore of the body between an open position and a closed position, and a valve stem journaled in an aperture of the valve body and connected at the valve member for rotation thereof, the valve body further having an outer surface provided with a slot around the aperture, the actuator mounting kit comprising:
- a mounting bracket connectable to the valve body, the mounting bracket having a bottom portion and a top portion, the bottom portion having a stem aperture through which the valve stem extends when the mounting bracket is connected to the valve body and a lower surface with a tongue matingly engaged with the slot of the valve body when the mounting bracket is connected to the valve body, the upper portion having a driver aperture aligned with the stem aperture; and
- a stem driver having a first end matingly engageable with the valve stem and a second end extendable through the driver aperture in a way that the actuator is matingly engageable with the second end of the stem driver when the actuator is connected to the upper portion of the mounting bracket.

2. The actuator mounting kit of claim 1, wherein the mounting bracket and the stem driver have corresponding valve position indicator markings.

3. The actuator mounting kit of claim 1, further comprising a connector connected positionable about the valve body and connected to the mounting bracket.

4. The actuator mounting kit of claim 3, wherein the connector is a U-bolt positionable about the valve body and secured to the lower portion of the mounting bracket.

5. The actuator mounting kit of claim 4, wherein the lower portion of the mounting bracket has a pair of holes on opposing ends of the tongue for receiving ends of the U-bolt, the pair of holes being aligned with the stem aperture.

6. The actuator mounting kit of claim 1, wherein the stem aperture has a counterbore from the lower side, and wherein the actuator mounting kit further comprises an alignment bushing positioned in the counterbore and positionable about the valve stem when the mounting bracket is connected to the valve body.

7. A valve assembly, comprising:
a valve comprising:
- a valve body having an upstream end face, a downstream end face, a bore extending therethrough intersecting the end faces, and an aperture formed therein intersecting the bore;
- a valve member disposed within the bore of the valve body intermediate the end faces and rotatable from a position wherein the bore is open to a position wherein the bore is closed; and
- a valve stem journaled in the aperture of the valve body and connected at an inner end thereof to the valve member for rotation thereof,
wherein the valve body has an outer surface provided with a slot around the aperture:
an actuator mounting kit comprising:
- a mounting bracket connected to the valve body, the mounting bracket having a bottom portion and a top portion spaced from the bottom portion, the bottom portion having a stem aperture through which the valve stem extends and a lower surface with a tongue matingly engaged with the slot of the valve body, the upper portion having a driver aperture aligned with the stem aperture; and
- a stem driver having a first end matingly engaged with the valve stem and a second end extending through the driver aperture; and
an automatic actuator mounted to the top portion of the mounting bracket and matingly engaged with the second end of the stem driver.

8. The valve assembly of claim 7, wherein the mounting bracket and the stem driver have corresponding valve position indicator markings.

9. The valve assembly of claim 7, wherein the actuator mounting kit further comprises a connector.

10. The valve assembly of claim 9, wherein the connector is a U-bolt positioned about the valve body and secured to the lower portion of the mounting bracket.

11. The valve assembly of claim 10, wherein the lower portion of the mounting bracket has a pair of holes on opposing ends of the tongue for receiving ends of the U-bolt, the pair of holes being aligned with the stem aperture.

12. The valve assembly of claim 7, wherein the stem aperture has a counterbore from the lower side, and wherein the actuator mounting kit further comprises an alignment bushing positioned in the counterbore and positioned about the valve stem.

* * * * *